United States Patent [19]
Mitsui

[11] Patent Number: 6,042,362
[45] Date of Patent: Mar. 28, 2000

[54] THERMOSETTING RESIN INJECTION MOLDING MACHINE

[75] Inventor: Masahiro Mitsui, Fujieda, Japan

[73] Assignee: Sumitomo Bakelite Company Limited, Tokyo, Japan

[21] Appl. No.: 09/119,454

[22] Filed: Jul. 21, 1998

[30] Foreign Application Priority Data

Jul. 25, 1997 [JP] Japan .................................. 09-200523
Nov. 26, 1997 [JP] Japan .................................. 09-324723
Nov. 26, 1997 [JP] Japan .................................. 09-324724

[51] Int. Cl.$^7$ .................................................. B29C 45/54
[52] U.S. Cl. ........................................... 425/550; 425/555
[58] Field of Search .................................... 425/542, 550, 425/555, 557, 559, 561

[56] References Cited

U.S. PATENT DOCUMENTS 3,020,591  2/1962  Breher et al. .
4,645,445  2/1987  Takanashi .............................. 425/542

*Primary Examiner*—Tim Heitbrink
*Attorney, Agent, or Firm*—Smith, Gambrell & Russell, LLP

[57] ABSTRACT

There is disclosed a thermosetting resin injection molding machine comprising: a heating cylinder including a body having a device for introducing a resin material into said body, and a sleeve having an injection port for injecting the resin material; and a screw reciprocally movable in the heating cylinder, wherein the screw includes a body having a flight, and a piston portion provided at a front end of the screw body, and a diameter of the piston portion is smaller than a diameter of the flight; wherein an inner diameter of a working portion of the sleeve is smaller than an inner diameter of the heating cylinder body; wherein a length of the piston portion, a length of the working portion of the sleeve and an annular clearance between the working portion of the sleeve and the piston portion are so determined that a predetermined amount of the resin can remain for cushion molding at a front end of the piston portion during dwell after the injection of the resin material; and wherein a resin compressing portion is interposed between the piston portion and the screw body, and the resin compressing portion has a diameter which is larger than the diameter of the piston portion, and is smaller than the diameter of the flight.

8 Claims, 3 Drawing Sheets

THERMOSETTING RESIN INJECTION MOLDING MACHINE

BACKGROUND OF THE INVENTION

1. Field of the Invention

This invention relates to a thermosetting resin injection molding machine.

2. Related Art

In general, a thermosetting resin injection molding machine adopts a full-flight screw of a low compression ratio so that a resin material, when melted, will not be cured within a heating cylinder. Examples of the thermosetting resin are a phenolic resin, an epoxy resin, a melamine resin, an unsaturated polyester resin, a diacrylphthalate resin, a urea resin and a silicone resin.

The flight screw has a helical groove formed at an equal pitch in an outer peripheral surface thereof. Accordingly a back flow of the resin material may occur during the injection molding, and then the cushion molding hardly occur. Therefore, in many cases, the stable molding can not be effected.

In this specification, the term "dwell" means that after a molten thermosetting resin molding material is injected in a die (or mold), the pressure of the resin is maintained for a predetermined period of time. If a molded product, which has begun to be cured (set) and shrunk in the die, is left as it is, shrinkage marks and voids are formed in the molded product. The purpose of the dwell is to supply an amount of resin corresponding to the shrinkage so as to satisfactorily fill the die with the resin material. Thus, the dwell plays a very important role in the quality of the molded product. Dwell conditions can be adjusted. If the dwell pressure and the dwell time are insufficient, shrinkage marks develop in the molded product. In contrast, if the pressure is too high, or the dwell time is too long, this causes a strain to remain in the molded product, and also causes flashes to be formed on the molded product. Generally, a thermosetting resin molding material, when cured in a die, shrinks. Therefore the larger the curing shrinkage of the resin is, or the larger the thickness of the molded product is, the more the effect by the dwell is expected.

The term "cushion molding" means a molding in which in order to effect the dwell sufficiently, a small amount of a molten resin material is left at a front end portion of a screw after the injection is finished, and the dwell is applied by this molten resin, and with this method, the stable molding can be achieved. If a back flow of the resin material is large, the screw advances to a foremost position before the sufficient dwell is applied, so that the sufficient dwell can not be applied.

Therefore, there have been proposed a screw having a back flow prevention ring or a piston function. A screw having the piston function at a front end portion thereof operates in the same manner as that of an ordinary full-flight screw before a piston enters a sleeve portion, and therefore this screw can not prevent a back flow. In a screw having the back flow prevention ring, a back flow during the injection can be reduced, but the thermal stability of the molten resin within the cylinder is deteriorated due to heat generated when the resin material is metered, and the operability at the time when the molding operation is finished is not good. For example, an additional work such as the removal of the cured or solidified resin is required.

SUMMARY OF THE INVENTION

An object of the present invention is to provide a thermosetting resin injection molding machine in which a back flow of resin material is reduced and the thermal stability of the molten resin in the cylinder is improved.

To this end, according to the present invention, there is provided a thermosetting resin injection molding machine comprising: a heating cylinder including a body having means for introducing a resin material into said body, and a sleeve having an injection port for injecting the resin material; and a screw reciprocally movable in the heating cylinder, wherein the screw includes a body having a flight, and a piston portion provided at a front end of the screw body, and a diameter of the piston portion is smaller than a diameter of the flight; wherein an inner diameter of a working portion of the sleeve is smaller than an inner diameter of the heating cylinder body; wherein a length of the piston portion, a length of the working portion of the sleeve and an annular clearance between the working portion of the sleeve and the piston portion are so determined that a predetermined amount of the resin can remain for cushion molding at a front end of the piston portion during dwell after the injection of the resin material; and wherein a resin compressing portion is interposed between the piston portion and the screw body, and the resin compressing portion has a diameter which is larger than the diameter of the piston portion, and is smaller than the diameter of the flight.

DESCRIPTION OF THE PREFERRED EMBODIMENTS

Figure 1:
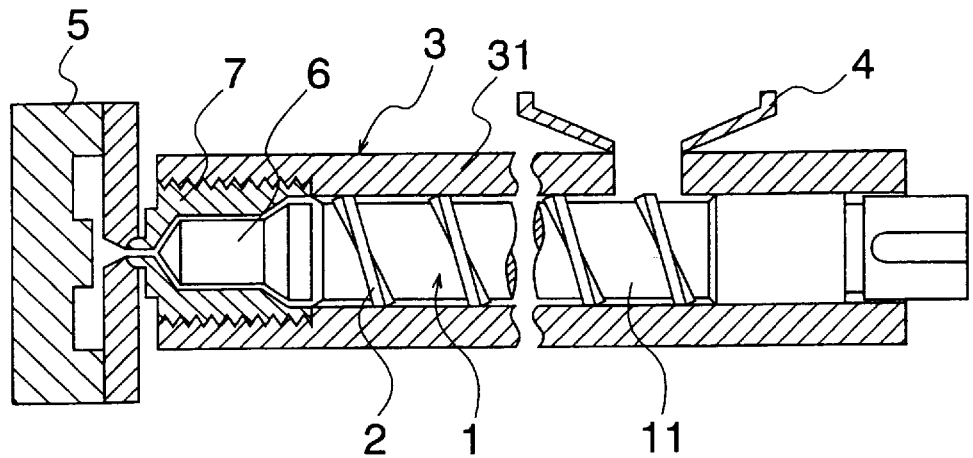
FIG. 1 is a schematic, cross-sectional view of one preferred embodiment of a thermosetting resin injection molding machine of the present invention.

A preferred embodiment of the present invention will now be described in detail with reference to FIGS. 1 and 2. Referring to FIG. 1, a thermosetting resin injection molding machine includes a heating cylinder 3 provided with a cylinder body 31 and with a sleeve 7, and a screw 1 provided with a screw body 11 having a flight 2 and with a piston portion 6.

The sleeve 7 is screw-mounted onto a radial inner front end portion of the cylinder body 31. A distal end of the sleeve 7 is reduced at an inner diameter thereof and communicated with an interior of a die 5. The piston portion 6 is shaped to be complementary to an interior of the sleeve 7. The screw 1 further includes a resin compressing portion 8 interposed between the piston portion 6 and the screw body 11 (FIG. 2). A diameter d1 of the resin compressing 20 portion 8 is larger than a diameter D1 of the screw body 11.

In a thermosetting resin injection molding machine, an inner diameter of a heating cylinder as well as a diameter of a flight of a screw is usually 20 mm to 80 mm, and more commonly 30 mm to 65 mm. A ratio of a diameter of a screw body to a diameter of the flight of the screw is usually 0.65 to 0.85, and more commonly 0.7 to 0.8.

In the injection molding machine shown in FIG. 1, the screw 1 is rotated without translation motion to feed a resin material charged from a hopper 4 into the heating cylinder 3 along the screw 1, and then the resin material is melted. The melted resin material is fed into a front end portion 12 of the heating cylinder 3 and is metered. Then, the screw 1 is translated without rotational motion, thereby injecting the melted resin material into the die 5.

Figure 2:
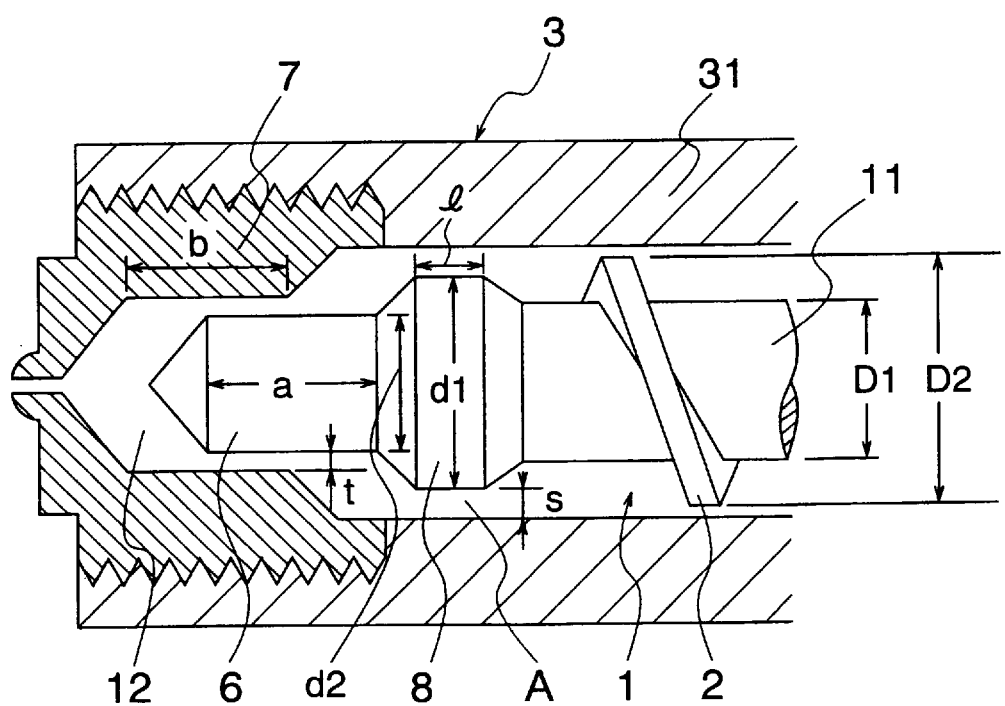
FIG. 2 is a fragmentary enlarged sectional view of front end portions of a screw and a cylinder of the injection molding machine shown in FIG. 1.

A flow of the resin material is now described in great detail with referring to FIG. 2. At the time of the metering, the molten resin is fed to the front end portion 12 along the flight 2 in accordance with the rotation of the screw 1. When the molten resin passes through an annular resin compressing space A defined between the resin compressing portion 8 of the screw 1 and an inner wall of the cylinder body 31, the temperature of the molten resin is raised by heat due to the shearing of the resin. Therefore, the molten resin material is lowered in viscosity, and then the front end portion 12 of the cylinder 3 is filled with such molten resin material.

At the time of the injection, the resin compressing portion 8 serves as a back flow prevention portion to reduce a back flow until the piston portion 6 comes into engage with a working portion of the sleeve 7. After the piston portion 6 is engaged with the working portion of the sleeve 7, the piston portion 6 serves as a back flow prevention portion, and then the sufficient dwell can be applied. Further, the wear of the screw is reduced because of the increased resin temperature, the enhanced kneading and the lowered resin viscosity.

Figure 3:
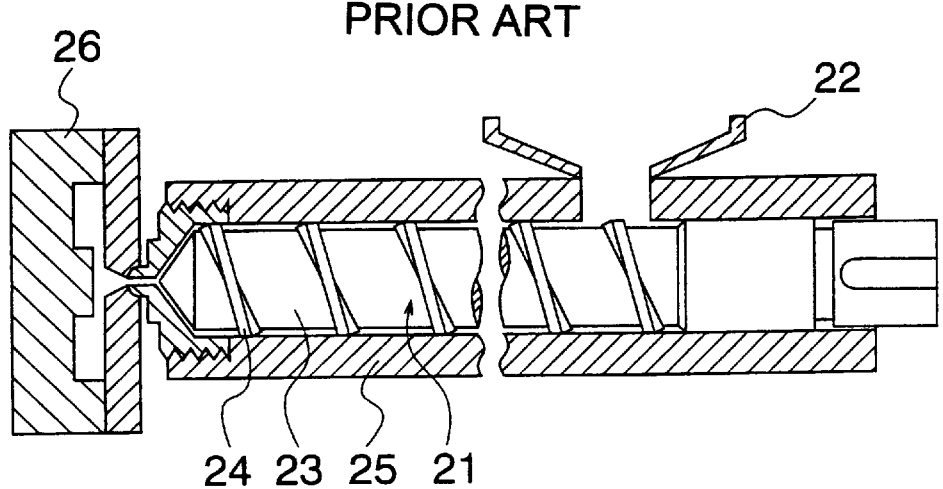
FIG. 3 is a schematic, cross-sectional view of a conventional thermosetting resin injection molding machine.

In a conventional thermosetting resin injection molding machine, as shown in FIG. 3, in accordance with the rotation of the screw 21, a resin material from a hopper 22 is fed forwardly along a screw body 23 having a flight 24, and is melted, and is fed in a predetermined amount in a front end portion of the heating cylinder 25 (To fill the predetermined amount of the resin material in the front end portion of the heating cylinder is referred to as "to meter"). Thereafter, the molten resin material is injected into a die 26. At this time, however, since there is not provided any back flow prevention mechanism, the thus filled and metered resin material flows back along the screw during the injection (that is, before the injection is finished), so that the required amount of the resin material can not be injected into the die 25. Because of this back flow, it is difficult to apply a sufficient dwell necessary for the stable molding.

In this embodiment shown in FIG. 2, in order that the sufficient back flow prevention effect can be performed, a length a of the piston portion 6 and a length b of the working portion of the sleeve 7 are preferably both not less than 2 mm, and are not more than a diameter D2 of the flight 2 ($2 \leq a, b \leq D2$). If these lengths are less than 2 mm, a length of the engaged portion is short, and therefore the back flow prevention effect, obtained during the injection of the resin material, is insufficient. A back flow may occur and it is hard to obtain the cushion molding effectively. On the other hand, if these lengths are more than the diameter D2 of the flight 2, a length of the engaged portion is too long, which leads to possibilities that the piston portion 6 and the sleeve 7 are subjected to galling or damage and that the molten resin is cured by heat generated by contact between the two portions. In view of the back flow prevention effect, the engagement between the piston portion and the sleeve portion, the machining precision and so on, the length of the piston portion 6 and the length of the working portion of the sleeve 7 are more preferably 5 mm to 10 mm. Preferably, the lower the viscosity of the molten resin is, the longer these lengths a and b become.

In this embodiment, although the piston portion 6 and the working portion of the sleeve 7 are usually substantially equal in length to each other, one of the two may be longer 2 mm to 5 mm than the other.

In order to achieve the sufficient back flow prevention effect, a radial clearance t between the piston portion 6 and the sleeve 7 is preferably 0.05 mm to 3 mm. If it is less than 0.05 mm, galling may develop on the piston portion and the sleeve portion since there is almost no clearance therebetween, and therefore the production efficiency is lowered, and this is not advantageous. If this clearance t is more than 3 mm, the back flow prevention effect is incomplete, and then a back flow occurs, so that the cushion molding can not be carried out effectively. In order to achieve the back flow prevention effect and also to prevent the above galling, the clearance t is preferably 0.1 mm to 2 mm, and more preferably 0.1 mm to 0.5 mm.

In order to effect the stable cushion molding, the ratio of a diameter d2 of the piston portion 6 to a diameter D2 of the flight 2 is preferably not less than 0.5 and is less than 1 ($0.5 \leq d2/D2 < 1$). If this ratio is less than 0.5, the injection pressure is much increased at the piston portion since the difference between the diameters of the piston portion and the flight is large, and this leads to possibilities that excessive flashes or burrs are formed on the molded product and that the die may be damaged. Further, since the piston portion 6 becomes thin, the strength of the screw may be insufficient. More preferably, the ratio of the diameter of the piston portion 6 to the diameter of the flight 2 is 0.7 to 0.9 ($0.7 \leq d2/D2 \leq 0.9$). In this embodiment, the diameter d2 of the piston portion 6 is 10 mm to 70 mm.

If an axial length l of the resin compressing portion 8 is too short, this portion can be much worn, and to the contrary, if this length is too long, the metering needs much more time, and therefore this length is preferably 3 mm to 10 mm. If a radial clearance s between the resin compressing portion and the cylinder is too large, the increment of the resin temperature due to heat generated by the shearing is small, and to the contrary, if this clearance is too small, the resin temperature rises excessively, so that the resin material is cured at the front end portion of the cylinder. Therefore, this clearance is preferably 1 mm to 4 mm.

For the same reasons described above for the ratio of the diameter d2 of the piston portion to the diameter D2 of the flight, the ratio of the diameter d2 of the piston portion to the diameter d1 of the resin compressing portion 8 is preferably greater than 0.5 and less than 1 ($0.5 \leq d2/d1 < 1.0$), and more preferably 0.7 to 0.9 ($0.7 \leq d2/d1 \leq 0.9$).

In a most preferred form of the injection molding machine of the present invention having the above configuration, when the diameter D2 of the flight 2 is 40 mm, the diameter D1 of the screw body 11 is 27 mm to 32 mm, the length a of the piston portion 6 as well as the length b of the working portion of the sleeve 7 is 10 mm to 15 mm, the diameter d2 of the piston portion 6 is 27 mm to 32 mm, the clearance t is 0.2 mm to 0.3 mm, the length l of the resin compressing portion 8 is 5 mm to 8 mm, the diameter d1 of the resin compressing portion is 34 mm to 36 mm, and the clearance s is 2 mm to 3 mm.

Figure 5:
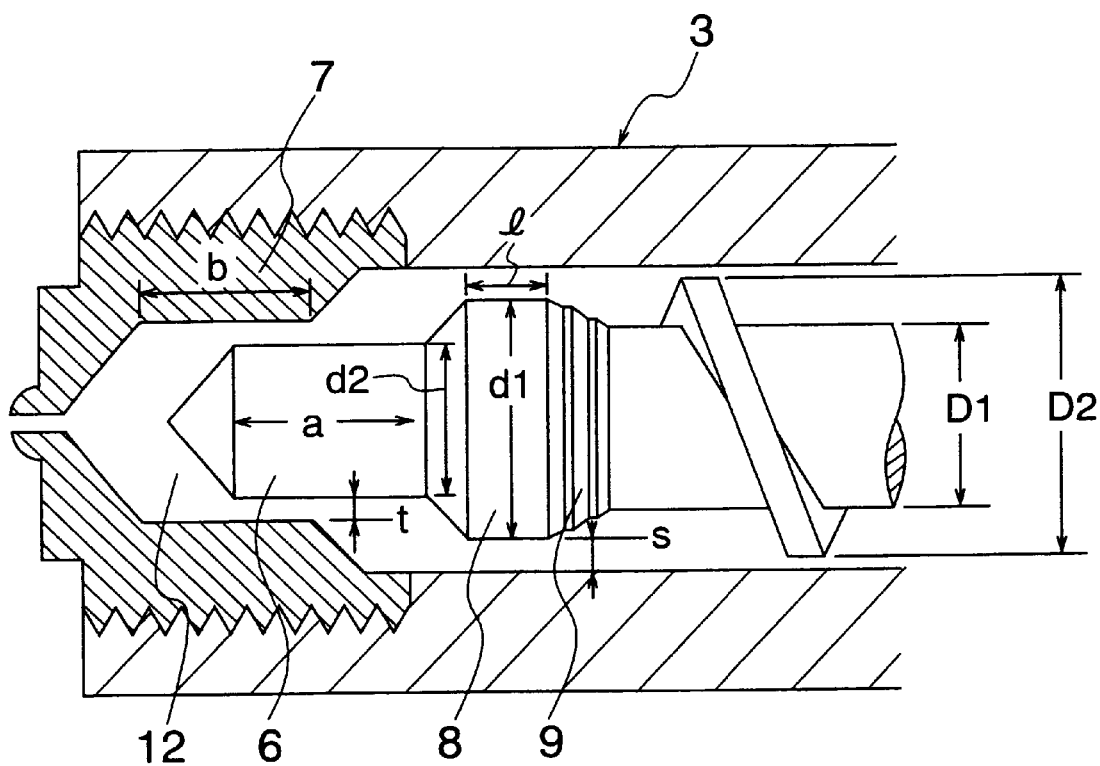

Although a rear portion of the resin compressing portion 8 is generally gradually tapered backwards, this rear portion can be provided with a plurality of annular steps 9 (see FIG. 5). With this configuration, heat is easily generated by the shearing of the molten resin, so that the resin temperature can be further increased. The reason for this is that a forward flow of the resin material receives a resistance at this stepped portion at the time of the metering, so that the resin temperature is raised by a stirring-kneading effect. However, if this stepped portion comprises only one step, the resin resides at the one step, and there is a possibility that the residing resin is cured, and this is not desirable. The number of steps and the dimension thereof may be changed in accordance with the molding conditions.

Figure 4:
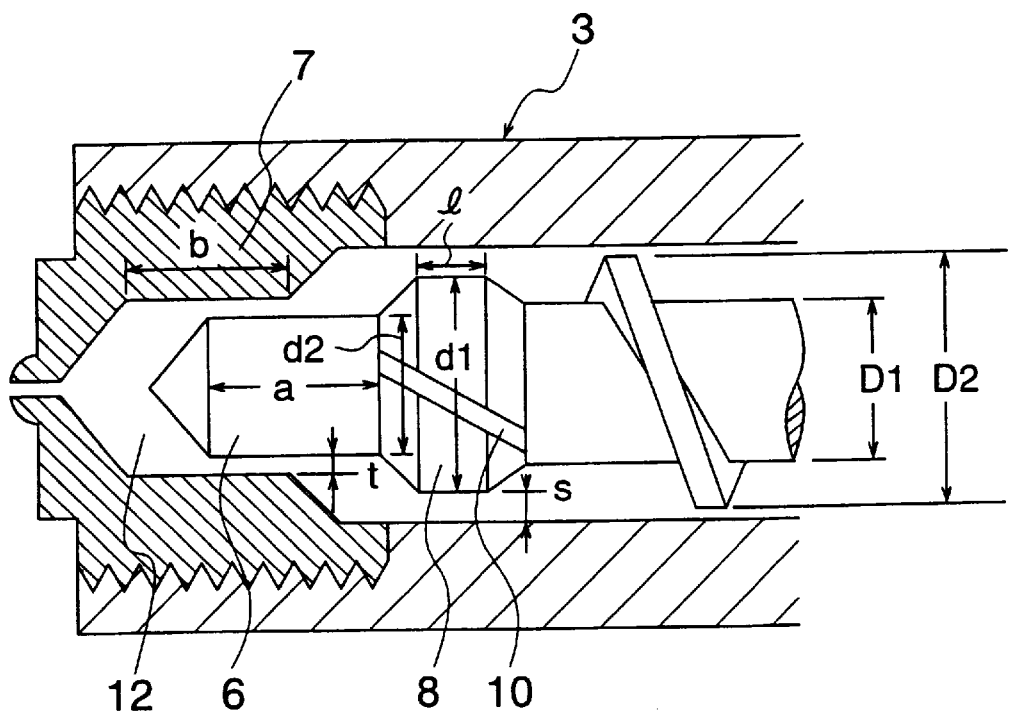
FIGS. 4 and 5 are fragmentary enlarged sectional views of front end portions of a screw and a cylinder of the thermosetting resin injection molding machines according to another embodiments of the present invention, respectively.

By forming a groove 10 in the resin compressing portion 8 (see FIG. 4), the enhanced degree of kneading can be achieved, and also a passage for the molten resin can be secured, and therefore the thermal stability can be enhanced. With respect to the shape of the groove in the resin compressing portion, if a width of the groove is too wide, the kneading effect is small, and a back flow becomes large. If the groove width is too small, the kneading effect becomes excessive, so that the curing of the molten resin is promoted. Therefore, the groove width is preferably 2 mm to 20 mm. In order to enhance the thermal stability of the molten resin, the number of the grooves is preferably 2 to 12 in view of the groove width and the time required for forming the head, but this number is not particularly limited.

Since the resin compressing portion is formed at the portion of the screw disposed at the rear end of the piston portion at the front end of the screw, the following effects can be obtained. Namely, at the time of metering the resin material, the resin temperature is raised by the heat generated by the shearing of the resin, so that the viscosity of the resin can be lowered, and a back flow during the injection can be reduced, and wear of the piston portion of the screw can be reduced. Thanks to the provision of the back flow prevention mechanism, the resin material can be injected into the die without flowing backward. Therefore, even when the molding conditions, e.g. the viscosity of the molten resin, the injection speed and the injection pressure, are varied, the resin material, metered for injection purposes, will not substantially flow back. Therefore, the predetermined amount of the resin is always injected stably into the die, so that the molded product, having less flashes, can be formed. Further, the cushion molding can be effected, and the necessary dwell can be applied, and therefore the stable, continuous molding, subjected to less variations, can be carried out.

Furthermore, by forming the groove in the resin compressing portion, the degree of kneading can be enhanced, and also the passage for the molten resin can be obtained at the time of metering the resin, and therefore the thermal stability of the molten resin material is enhanced. By forming the rear portion of the resin compressing portion into a multi-step configuration, the resin temperature can be increased because of the enhanced degree of kneading.

What is claimed is:

1. A thermosetting resin injection molding machine comprising:
   a heating cylinder including a body having means for introducing a resin material into said body, and a sleeve having an injection port for injecting the resin material; and
   a screw reciprocally movable in said heating cylinder;
   wherein said screw includes a body having a flight, and a piston portion provided at a front end of said screw body, and a diameter of said piston portion is smaller than a diameter of said flight;
   wherein an inner diameter of a working portion of said sleeve is smaller than an inner diameter of said heating cylinder body;
   wherein a length of said piston portion, a length of said working portion of said sleeve and an annular clearance between said working portion of said sleeve and said piston portion are so determined that a predetermined amount of the resin can remain for cushion molding at a front end of said piston portion during dwell after the injection of the resin material; and
   wherein a resin compressing portion is interposed between said piston portion and said screw body, and said resin compressing portion has a diameter which is larger than the diameter of said piston portion, and is smaller than the diameter of said flight.

2. An injection molding machine according to claim 1, wherein said resin compressing portion is provided at a rear portion thereof with a multi-step portion having a plurality of steps.

3. An injection molding machine according to claim 1, wherein a groove through which the molten resin passes is formed in said resin compressing portion.

4. An injection molding machine according to claim 1, wherein the length of said piston portion and the length of said working portion of said sleeve are both not less than 2 mm, and are not more than the diameter of said flight.

5. An injection molding machine according to claim 1, wherein the clearance between said piston portion and said working portion of said sleeve is 0.05 mm to 3 mm.

6. An injection molding machine according to claim 1, wherein the ratio of the diameter of said piston portion to the diameter of said flight is not less than 0.5, and is less than 1.

7. An injection molding machine according to claim 1, wherein a length of said resin compressing portion is not less than 2 mm, and is not more than the diameter of said flight.

8. An injection molding machine according to claim 1, wherein the ratio of the diameter of said piston portion to the diameter of said resin compressing portion is not less than 0.5, and is less than 1, and the diameter of said resin compressing portion is larger than a diameter of said screw body, and is smaller than the diameter of said flight.

* * * * *